(12) United States Patent
Sato et al.

(10) Patent No.: US 6,846,538 B2
(45) Date of Patent: Jan. 25, 2005

(54) COMPOSITE SHEET, METHOD OF PREPARING SAME, AND ADHESIVE LABEL SHEET ASSEMBLY HAVING SAME

(75) Inventors: Masahiro Sato, Shizuoka-ken (JP); Masanaka Nagamoto, Susono (JP); Takeshi Akimoto, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/323,559

(22) Filed: Dec. 19, 2002

(65) Prior Publication Data

US 2003/0170414 A1 Sep. 11, 2003

(30) Foreign Application Priority Data

| Dec. 27, 2001 | (JP) | ........................... 2001-398076 |
| Mar. 20, 2002 | (JP) | ........................... 2002-078767 |

(51) Int. Cl.$^7$ ............................................. B32B 29/06
(52) U.S. Cl. .................... 428/40.1; 428/40.2; 428/40.5; 428/41.3; 428/41.7; 428/41.8; 428/42.1; 428/409; 428/537.5; 503/227
(58) Field of Search ................. 428/40.1, 40.2, 428/40.5, 41.3, 41.7, 41.8, 42.1, 409, 537.5; 503/227

(56) References Cited

U.S. PATENT DOCUMENTS

| 4,636,819 A | 1/1987 | Nagamoto et al. |
| 4,659,644 A | 4/1987 | Hoshina et al. |
| 4,777,079 A | 10/1988 | Nagamoto et al. |
| 5,053,267 A | 10/1991 | Ide et al. |
| 5,110,389 A | 5/1992 | Hiyoshi et al. |
| 5,248,543 A | 9/1993 | Yamaguchi et al. |
| 5,336,548 A | 8/1994 | Shiokawa et al. |
| 5,409,758 A | 4/1995 | Hiyoshi et al. |
| 5,654,039 A | 8/1997 | Wenzel et al. |
| 5,721,190 A | 2/1998 | Miyamoto et al. |
| 5,763,354 A | 6/1998 | Nagamoto |
| 5,846,358 A | 12/1998 | Nagamoto et al. |
| 5,912,204 A | 6/1999 | Yamada et al. |
| 6,031,553 A | 2/2000 | Nagamoto et al. |
| 6,043,190 A | 3/2000 | Ichikawa et al. |
| 6,060,427 A | 5/2000 | Mori et al. |
| 6,172,698 B1 | 1/2001 | Iwata et al. |
| 6,298,894 B1 | 10/2001 | Nagamoto et al. |
| 6,388,692 B1 | 5/2002 | Iwata et al. |
| 6,500,536 B1 | 12/2002 | Yamada et al. |
| 6,501,495 B1 * | 12/2002 | Ichikawa et al. ............ 347/171 |
| 6,670,010 B2 * | 12/2003 | Nagamoto et al. ......... 428/41.8 |
| 2003/0168592 A1 * | 9/2003 | Yamada et al. .............. 250/288 |

FOREIGN PATENT DOCUMENTS

| EP | 1279768 | 1/2003 |
| JP | 7109699 | 4/1995 |
| JP | 7229096 | 8/1995 |
| JP | 8144198 | 6/1996 |
| JP | 9031898 | 2/1997 |
| JP | 9217299 | 8/1997 |
| JP | 10204795 | 8/1998 |
| JP | 2000010485 | 1/2000 |
| JP | 2000-242175 | * 9/2000 |
| JP | 2001271295 | 10/2001 |

* cited by examiner

*Primary Examiner*—Nasser Ahmad
(74) *Attorney, Agent, or Firm*—Cooper & Dunham LLP

(57) ABSTRACT

A composite sheet including a paper layer made of a wood pulp having a Canadian standard freeness value of 350 to 500 ml, a transparency improving layer provided over one side of the paper layer, and a release liner provided over the transparency improving layer. The composite sheet has a transmittance of at least 10 to 20% for a light with a wavelength of 940 to 960 nm and a bulk density of 0.90 to 1.15 g/cm$^3$. A thermosensitive recording adhesive label sheet has the above composite sheet and a thermosensitive recording sheet provided on the composite sheet through an adhesive layer.

10 Claims, 1 Drawing Sheet

COMPOSITE SHEET, METHOD OF PREPARING SAME, AND ADHESIVE LABEL SHEET ASSEMBLY HAVING SAME

BACKGROUND OF THE INVENTION

This invention relates to a composite sheet useful as a disposable backing sheet of an adhesive label assembly and to a method of preparing the composite sheet. The present invention is also directed to an adhesive label assembly having an adhesive label sheet releasably adhered to the composite sheet serving as a disposable backing sheet.

Recently, adhesive labels have been used in a wide variety of fields in the forms of, for example, labels, seals, stickers, tags and emblems. An adhesive label assembly is composed of a disposable backing sheet, a label sheet provided on the backing sheet, and an adhesive layer interposed between the backing sheet and the label sheet such that the label sheet is peelable together with the adhesive layer from the backing sheet. The backing sheet generally includes a paper layer on which a release liner is provided. Glassine paper or plain paper such as wood-free paper, glazed paper or kraft paper is generally used as the paper layer.

Because of its good light permeability, glassine paper has been widely used as the backing sheet. Glassine paper, which is made of a intensively beaten chemical pulp and which is subjected to calendaring, has a Canadian standard freeness value of 300 ml or less and porosity of about 20 to 30%. As compared with plain paper such as wood-free paper, glazed paper or kraft paper, therefore, glassine paper has poor disintegratability and is ill-suited for recycle use.

To improve disintegratability of the glassine paper while retaining desired light permeability, a lot of proposals have been made. Japanese Laid-Open Patent Publication No. H07-109699 proposes the use of a glassine paper having a Cobb size value (30 seconds) of 35–65 $g/m^2$ and made of a wood pulp having a Canadian standard freeness value of 130 to 240 ml. Japanese Laid-Open Patent Publications No. H09-031898 proposes the use of a treated paper obtained by passing a glassine paper made of a wood pulp having a Canadian standard freeness value of 130 to 240 ml through a nip between a pair of rolls at 10-50 kg/cm, followed by application of an aqueous solution of polyvinyl alcohol. Japanese Laid-Open Patent Publications No. H09-41286 proposes providing a glassine paper with an undercoat containing polyvinyl alcohol having a polymerization degree of 1,500–2,700 and a saponification degree of 80–90 mole %. Japanese Laid-Open Patent Publications No. H09-217299 discloses a backing sheet having a glassine paper made of a mixture of 90 to 60 parts by weight of a highly disintegrated pulp having a Canadian standard freeness value of 100 to 250 ml with 10 to 40 parts by weight of a lowly disintegrated pulp having a Canadian standard freeness value of at least 400 ml. Japanese Laid-Open Patent Publications No. H10-204795 suggests providing a glassine paper with an undercoat containing a water soluble polymer and a pigment having a particle size of 0.4 μm or less.

Plain paper has better disintegratability but has lower light permeability than glassine paper. An adhesive label assembly whose backing sheet has poor light permeability is ill-suited for use with printers provided with a light transmission-type label position sensor. To improve the light permeability, therefore, it is necessary to reduce the thickness of the backing sheet. This results in difficulty in cutting the label sheet on the backing sheet into a plurality of labels and in difficulty in removing cut labels therefrom.

To improve light permeability of the plain paper while retaining desired disintegratability, a lot of proposals have been also made. Thus, Japanese Laid-Open Patent Publication No. H08-144198 proposes the use of paper layer having formed thereon a barrier layer including at least one resin selected from polyacrylamide-acrylate copolymers, styrene-butadiene copolymers and copolymers of polyvinyl alcohol with a polystyrene-acrylate polymer. Japanese Laid-Open Patent Publication No. H11-1897 discloses a backing sheet including a machine glazed paper layer, a coating of a water-soluble polymer provided on the paper layer, and a release liner provided on the polymer coating. The polymer coating has a Cobb size value (60 seconds) of 10 to 40 $g/,m^2$ and a Beck's smoothness of 300 to 1000 seconds. Japanese Laid-Open Patent Publication No. 2001-271295 proposes forming a transparency improving layer over a wood-free paper to obtain light transmittance of 40–50%. Japanese Laid-Open Patent Publication No. H07-229096 proposes applying coating of styrene-butadiene latex on both sides of a paper to improve machinability of punching and slitting.

The known backing sheets, however, are still not fully satisfactory with respect to light permeability, disintegratability and punching machinability.

Plain paper when used as a disposable backing sheet has an additional problem because of higher ink absorption as compared with glassine paper. Thus, when an opposite side of the plain paper backing sheet from the releasable label sheet is printed, the ink penetrates into the backing sheet. Therefore, in order to obtain a desired print image density, it is necessary to increase the amount of the ink. This deteriorates the fineness of the pint image.

SUMMARY OF THE INVENTION

It is, therefore, the prime object of the present invention to provide a composite sheet which is useful as a backing sheet of an adhesive label assembly and which exhibits both good light permeability and good disintegratability.

Another object of the present invention is to provide a composite sheet of the above-mentioned type which has good machinability for punching or cutting.

It is a further object of the present invention to provide a composite sheet of the above-mentioned type which has good printability.

It is yet a further object of the present invention to provide a method of preparing the above composite sheet.

It is a further object of the present invention to provide an adhesive label assembly having the above composite sheet as a disposable backing sheet thereof.

In accomplishing the foregoing objects, there is provided in accordance with the present invention a composite sheet comprising a paper layer made of a wood pulp having a Canadian standard freeness value of 350 to 500 ml, a transparency improving layer provided over one side of said paper layer, and a release liner provided over an opposite surface of said transparency improving layer from said paper layer, said composite sheet having a transmittance of 10 to 20% for a light with a wavelength of 940 to 960 nm and a bulk density of 0.90 to 1.15 $g/cm^3$.

In another aspect, the present invention provides a method of preparing the above composite sheet, comprising the steps of:

applying a coating of a transparency improving layer-forming liquid onto a paper made of a wood pulp having a Canadian standard freeness value of 350 to 500 ml to form a transparency improving layer on said paper, subjecting said transparency improving layer provided on said paper to calendaring, and forming a release liner on said transparency improving layer.

The present invention also provides an adhesive label sheet assembly comprising the above composite sheet, an adhesive layer provided on said release liner of said composite sheet, and a label sheet provided on said adhesive layer such that said label sheet with said adhesive layer is peelable from said composite sheet.

BRIEF DESCRIPTION OF DRAWING

Other objects, features and advantages of the present invention will become apparent from the detailed description of the preferred embodiments of the invention which follows, when considered in the light of the accompanying drawing, in which.

DETAILED DESCRIPTION OF THE PREFERRED EMBODIMENTS OF THE INVENTION

Figure 1:
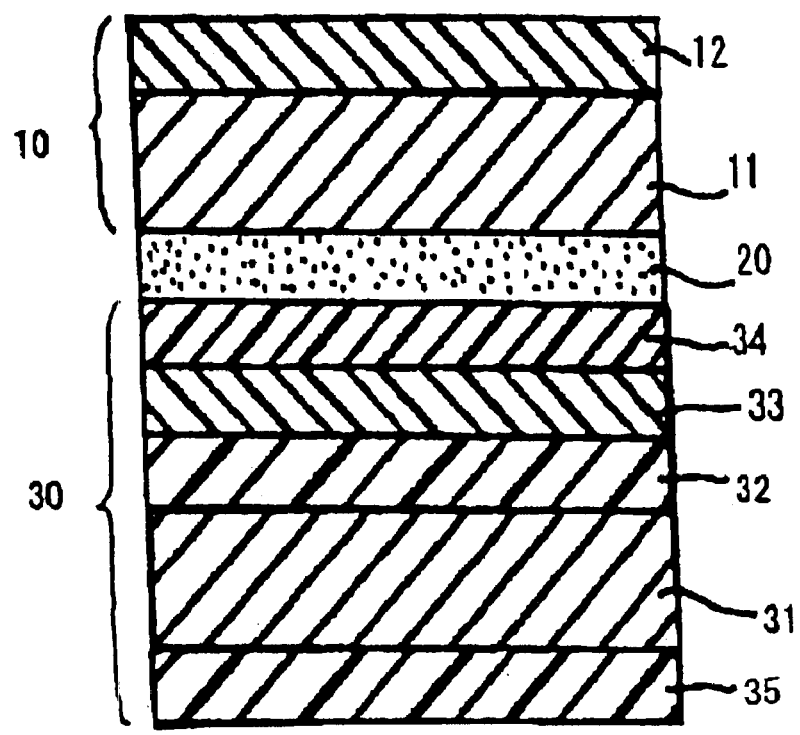
FIG. 1 is a cross-sectional view schematically illustrating an adhesive label assembly according to the present invention as applied to an adhesive thermosensitive recording label sheet assembly.

FIG. 1 depicts one preferred embodiment of a thermosensitive recording adhesive label assembly according to the present invention. The label assembly has a thermosensitive recording label sheet 10 releasably adhered to a disposable backing sheet 30 through an adhesive layer 20. The disposable backing sheet 30 is a composite sheet according to the present invention.

The composite sheet 30 comprises a paper layer 31, a transparency improving layer 32 provided over one side of the paper layer 31, and a release liner 34 provided on the transparency improving layer 32. Optionally interposed between the transparency improving layer 32 and the release liner 34 is a barrier layer 33. Designated as 35 is a printability improving layer optionally provided on the other side of the paper layer 31.

It is important that the composite sheet 30 should have a transmittance of 10 to 20% for a light with a wavelength of 940 to 960 nm and a bulk density of 0.90 to 1.15 g/cm$^3$ and that the paper layer 31 should be made of a wood pulp having a Canadian standard freeness value of 350 to 500 ml. Namely, in order to be suitably used as a backing sheet of a label assembly for use with a label printer having a label position sensor utilizing a light, the composite sheet 30 must show a transmittance of at least 10% for a light with a wavelength of 940 to 960 nm.

When the Canadian standard freeness of the paper layer 31 is less than 350 ml, it is difficult to obtain satisfactory disintegratability. Too high a freeness beyond 500 ml is undesirable because the light transmittance for a light with a wavelength of 940 to 960 nm is low. While the light transmittance of the composite sheet 30 may be improved by increasing the basis weight of the transparency improving layer 32, the use of a large amount of the transparency improving layer 32 causes an increase of the raw material costs, a reduction of disintegratability (thus, recyclability) and an increase of manufacturing time due to necessity of a long drying time of the transparency improving layer 32.

Preferably, the paper layer 31 has light transmittance of at least 7% for reasons of satisfactory light transmittance of the composite sheet 30 while maintaining the basis weight of the transparency improving layer 32 small. The paper layer preferably has a basis weight of 45 to 75 g/m$^2$, more preferably 55 to 65 g/m$^2$, and a thickness of 40 to 80 μm, more preferably 55 to 65 μm.

The transparency improving layer 32 is provided on one side of the paper layer 31 so that the paper layer 31 combined with the transparency improving layer 32 exhibits suitable transmittance for a light with a wavelength of 940 to 960 nm. The transparency improving layer 32, which serves to prevent absorption and refraction of light in the paper layer 31, contains a transparency improving agent. The transparency improving agent enters interstices in the paper layer 31 and substitutes for air. Thus, at least a part of, generally a greater part of, the transparency improving layer 32 is impregnated and present in the paper layer 31.

For reasons of enhanced transparency imparting efficiency, the transparency improving agent preferably has a refraction index similar to that of cellulose fiber (about 1.49). Examples of suitable transparency improving agent include sucrose acetate isobutylate, paraffin wax, polyolefin wax, glyceryl ether of polypropylene glycol, a polyester resin, a styrene resin, an acrylic resin, an amino resin, an urethane resin, polyolefin wax and a hydrogenated petroleum resin.

The amount of the transparency imparting agent is preferably 2 to 30% by weight, more preferably 3 to 20% by weight, based on the basis weight of the paper layer 31, for reasons of satisfactory transparency for the detection by a label position sensor and of maintenance of satisfactory disintegratability of the paper layer 31.

The transparency improving layer 32 may be formed by coating a coating liquid (such as emulsion) containing the transparency improving agent over a surface of the paper layer 31.

It is preferred that a barrier layer 33 containing a barrier substance be provided over the transparency improving layer 32 before the application of a coating of the release liner 34, so that the release liner 34 can be prevented from penetrating into the transparency improving layer 32 and, therefore, can be uniformly formed into a thin layer. If desired, the barrier substance may be incorporated into the transparency improving layer 32. Any material may be used as the barrier substance as long as it is capable of preventing the release liner components from entering the transparency improving layer 32. Water soluble polymers and water insoluble polymers may be used as the barrier substance.

Examples of the water soluble polymer include polyvinyl alcohol, starch and derivatives thereof, cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, alkali salts of isobutylene-maleic anhydride copolymer, polyacrylamide, sodium alginate, gelatin, and casein. Examples of the water insoluble polymer include latexes of styrene-butadiene copolymer and styrene-butadiene-acrylic copolymer; and emulsions of vinyl acetate resin, vinyl acetate-acrylic acid copolymer, styrene-acrylic ester copolymer, acrylic ester resin, and polyurethane resin. A pigment such as clay or silica may be incorporated into the barrier layer in such an amount that the light transmittance of the resulting composite sheet 30 is maintained in a proper range.

The amount of the barrier substance may vary with conditions under which calendaring of the paper layer 31 or a laminate of the paper layer 31, the transparency improving layer 32 and, optionally, the barrier layer 33 is performed, but is generally in the range of 2.0 to 10.0% based on the weight (basis weight) of the paper layer. For reasons of high barrier effect and maintenance of suitable disintegratability, the amount of the barrier substance is preferably 4.0 to 8.0% based on the weight of the paper layer.

Provided on the transparency improving layer 32 (or, if present, on the barrier layer 33) is a release liner 34. The release liner 34 contains a release agent such as a silicone resin, a fluorine resin, an aminoalkyd resin or a polyester resin. The release liner 34 may be formed by applying a coating liquid or solid by an emulsion, solution or solventless coating method. A solventless addition curable silicone is preferably used for reasons of safety, low costs, non-pollution and good release properties.

The amount of the release liner 34 is generally in the range of 0.7 to 10.0% based on the weight (basis weight) of the paper layer. For reasons of high releasing effect and maintenance of suitable disintegratability, the amount of the barrier substance is preferably 1.0 to 5.0% based on the weight of the paper layer.

It is preferred that the release liner 34 have a surface glossiness of 10 to 50%, more preferably 10 to 40%, for an angle of incidence of 75 degrees for reasons of improved machinability in punching and slitting of the composite sheet 30. Any method is suitably adopted for imparting the above glossiness to the surface of the release liner 34. One suitable method includes the use of a resin providing a low glossiness when formed into a film in the above-described transparency improving layer 32 and/or the barrier layer 33. Another method for obtaining suitable glossiness is to incorporate an inorganic or organic filler particles in the transparency improving layer 32 and/or the barrier layer 33.

Examples of the inorganic filler include kaolin, calcined kaolin, calcium carbonate, aluminum hydroxide, calcium sulfate, barium sulfate, titanium oxide, talk, zinc oxide, alumina, magnesium oxide, silica, bentonite, zeolite and sericite. Examples of the organic filler include polystyrene, urea resin, melamine resin, styrene-acrylate resin, urea-formaldehyde resin and vinyl chloride resin. These fillers may be used singly or in combination.

The amount of the filler varies according to the amount of the transparency improving layer 32 and/or the barrier layer 33 and is suitably determined so that a suitable surface glossiness is obtained while maintaining suitable light transmittance for a light with a wavelength of 940 to 960 nm. The amount of the filler is generally 0.5 to 8.0 g/m$^2$, preferably 1.0 to 6.0 g/m$^2$.

It is important that the composite sheet 30 should have a bulk density of 0.90 to 1.15 g/cm$^3$, preferably 0.95 to 1.10 g/cm$^3$. A bulk density of the composite sheet 30 below 0.90 g/cm$^3$ causes flaws and marks on the composite sheet 30 by cutters or knives during die cutting or punching. Too large a bulk density in excess of 1.15 g/cm$^3$ is disadvantageous from the economical point of view because a calendaring treatment must be carried out intensively.

Though any method may be adopted to obtain the above bulk density, calendaring is one of the suitable methods. Thus, in one preferred method, the paper layer 31 is first subjected to a calendaring treatment. Then, the transparent improving layer 32, barrier layer 33 (if desired) and release liner 34 are successively formed on the paper layer 31. The resulting laminate is then subjected to a calendaring treatment. Alternatively, the transparent improving layer 32, barrier layer 33 (if desired) and release liner 34 are successively formed on the paper layer 31 without being calendared. The resulting laminate is then subjected to a calendaring treatment.

As described previously, the composite sheet 30 must show a transmittance of 10 to 20% for a light with a wavelength of 940 to 960 nm. The light transmittance may be controlled by control of the basis weight and thickness of the paper layer 31, glossiness of the release liner 34 and the conditions under which the calendaring treatment is performed.

A printability improving layer 35 containing a resin and a pigment may be provided on the other side (backside) of the paper layer 31 for the purpose of improving printability thereof.

The pigment used in the printability improving layer 35 may be an inorganic pigment such as kaolin, calcined kaolin, calcium carbonate, aluminum hydroxide, calcium sulfate, barium sulfate, titanium oxide, talk, zinc oxide, alumina, magnesium oxide, silica, bentonite, zeolite or sericite, or an organic pigment such as polystyrene, urea resin, melamine resin or acrylic resin. These pigments may be used singly or in combination.

The resin used in the printability improving layer 35 may be a water soluble polymer or water-dispersible polymer. Examples of the resin include starch and derivatives thereof such as cationic starch, esterified starch, amphoteric starch, oxidized starch, enzyme-modified starch and etherated starch; cellulose derivatives such as methoxy cellulose, hydroxyethyl cellulose, carboxymethyl cellulose, methyl cellulose and ethyl cellulose; natural or semisynthetic polymers such as gelatin, natural rubber and casein; polydienes such as polyvinyl alcohol, isoprene, neoprene and polybutadiene; polyalkenes such as polybutene, polyisobutylene, polypropylene and polyethylene; vinyl polymers and copolymers such as (meth)acrylic acid, (meth)acrylates, (meth)acrylamide and methyl vinyl ether; synthetic rubber latex such as styrene-butadiene rubber and methyl methacrylate-butadiene copolymer; other synthetic polymers such as polyurethane resin, polyester resin, polyamide resin, olefin-maleic anhydride copolymer resin, ethylene-vinyl acetate resin and ethylene-ethyl acrylate copolymer resin. These resins may be used alone or in combination.

The weight ratio of the pigment to the resin in the printability improving layer 35 is preferably in the range of 1:9 to 9:1, more preferably 2:8 to 8:2, for reasons of attainment of suitable printability while maintaining desired binding strengths. The amount of the printability improving layer 35 is generally at least 0.5 g/m$^2$ preferably 1.0 to 10.0 g/m$^2$. The printability improving layer 35 preferably has a surface smoothness of at least 100 seconds, more preferably at least 150 seconds, for reasons of improved printability. The term "smoothness" herein is as measured in accordance with OUKEN-air press method described in JAPAN TAPPI No. 5-B. An Ouken-type smoothness measuring device (KY-55 manufactured by Kumagaya Riki Kogyo K. K.) is suitably used for this method. Though any method may be adopted to obtain the above surface smoothness, calendaring is one of the suitable methods.

The composite sheet 30 thus constructed is suitably used as a disposable backing sheet for an adhesive label assembly. The assembly may be prepared by applying a coating liquid for an adhesive layer 20 onto the release liner of the backing sheet 30. Then, a label sheet 10 is laminated on the adhesive layer 20, followed by necessary machining such as die cutting or punching to cut the label sheet 10 into a plurality of labels. When deep flaws or scars are formed on the backing sheet by cutters during the machining, the product assembly may be apt to be cut along the flaws during transferring thereof through a printer. Further, when the adhesive layer 20 enters the flaws, the labels are not easily releasable from the backing sheet.

To improve the cutting machinability, light permeability and surface smoothness, the composite sheet 30 is desirably subjected to a calendaring treatment. The calendaring may be machine calendar, super calendar, soft calendar, gloss calendar or matte calendar. The control of the smoothness may be either off-machine or on-machine. The calendaring conditions may be suitably selected according to the aimed bulk density and aimed light transmittance.

The label sheet 10 may be any base sheet for use as an adhesive label such as a printing sheet, a thermal transfer ribbon (TTR), an electrophotographic recording or printing sheet, an ink jet printing sheet, a sublimation-type ink receiving sheet or a thermosensitive recording sheet.

Description will be next made of a thermosensitive recording label sheet.

Referring still to FIG. 1, on the release liner 34 of the composite sheet 30 is provided a thermosensitive recording sheet 10 through an adhesive layer 20. The thermosensitive recording sheet 10 comprises a support 11 provided on the adhesive layer 20, and a thermosensitive recording layer 12 provided on the support 11.

The support 11 may be, for example, paper, synthetic paper, cloth, plastic film or a laminate thereof. A transparent film made of a polyester, such as polyethylene terephthalate or polybutylene terephthalate, a cellulose derivative, a polyolefin or polystyrene and a laminate of these films may also be used as the support 11.

The thermosensitive recording layer 12 contains one or more leuco dyes as a coloring agent. Suitable leuco dyes for use in the coloring layer, which may be employed alone or in combination, include any known leuco dyes for use in the conventional thermosensitive recording materials. For example, triphenylmethane-type leuco compounds, fluoran-type leuco compounds, phenothiazine-type leuco compounds, auramine-type leuco compounds, spiropyran-type leuco compounds, and indolinophthalide-type leuco compounds are preferably employed.

Specific examples of such leuco dyes include:

3,3-bis(p-dimethylaminophenyl)phthalide,
3,3-bis(p-dimethylaminophenyl)-6-dimethylaminophthalide (i.e., Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethyifluoran,
3-diethylamino-7-chlorofluoran,
3-diethylamino-7-methylfluoran,
3-diethylamino-7,8-benzfluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-[N-(3'-trifluoromethylphenyl)amino]-6-diethylaminofluoran,
2-[3,6-bis(diethylamino)-9-(o-chloroanilino)xanthyl]-benzoic acid lactam,
3-diethylamino-6-methyl-7-(m-trichloromethylanilino)-fluoran,
3-diethylamino-7-(o-chloroanilino)fluoran,
3-di-n-butylamino-7-(o-chloroanilino)fluoran,
3-(N-methyl-N-n-amylamino)-6-methyl-7-anilinofluoran,
3-(N-methyl-N-cyclohexylamino)-6-methyl-7-anilinofluoran,
3-diethylamino-6-methyl-7-anilinofluoran,
3-(N, N-diethylamino)-5-methyl-7-(N, N-dibenzylamino)-fluoran,
benzoyl leuco methylene blue,
6'-chloro-8'-methoxybenzoindolino spiropyran,
6'-bromo-3'-methoxybenzoindolino spiropyran,
3-(2'-hydroxy-4'-dimethylaminophenyl)-3-(2'-methoxy-5'-chlorophenyl) phthalide,
3-(21-hydroxy-4'-dimethylaminophenyl)-3-(2'-methoxy-5'-nitrophenyl) phthalide,
3-(2'-hydroxy-4'-diethylaminophenyl)-3-(2'-methoxy-5'-methylphenyl) phthalide,
3-diethylamino-6-methyl-7-(2',4'-dimethylanilino)fluoran,
3-(2'-methoxy-4'-dimethylaminophenyl)-3-(2'-hydroxy-4'-chloro-5'-methylphenyl) phthalide,
3,6-bis(dimethylamino)fluorenespiro(9,3')-6'-dimethylaminophthalide,
3-(p-dimethylaminophenyl)-3-{1,1-bis(p-dimethylaminophenyl)ethylene-2-yl}phthalide,
3-(p-dimethylaminophenyl)-3-{1,1-bis(p-dimethylaminophenyl) ethylene-2-yl}-6-dimethylaminophthalide,
3-(p-dimethylaminophenyl)-3-(1-p-dimethylaminophenyl)-1-phenylethylene-2-yl}phthalide,
3-(p-dimethylaminophenyl)-3-(1-p-dimethylamino-1-p-chlorophenylethylene-2-yl }-6-dimethylaminophthalide,
3-(4'-dimethylamino-2'methoxy)-3-(1"-p-dimethylaminophenyl-1"-p-chlorophenyl-1", 3"butadiene-4"-yl)benzophthalide,
3-(4'-dimethylamino-2'-benzyloxy)-3-(1"-p-dimethylaminophenyl-1"-phenyl-1",3"-butadiene-4"-yl) benzophthalide,
3-dimethylamino-6-dimethylaminofluorene-9-spiro-3'-(6'-dimethylaminophthalide,
3,3-bis{2-(p-dimethylaminophenyl)-2-(p-methoxyphenyl) ethenyl}4,5,6,7-tetrachlorophthalide,
3-bis{1,1-bis(4-pyrrolidinophenyl)ethylene-2-yl-5,6-dichloro-4,7-dibromophthalide,
bis(p-dimethylaminostyryl)-1-naphthalenesulfonylmethane,
3-(N-ethyl-N-tetrahydrofurfurylamino)-6-methyl-7-anilinofluoran,
3-(N-ethyl-N-2-ethoxypropylamino)-6-methyl-7-anilinofluoran,
3-N-methyl-N-isobutyl-6-methyl-7-anilinofluoran,
3-morphorino-7-(N-propyltrifluoromethylanilino)fluoran,
3-pyrrolidino-7-trifluoromethylanilinofluoran,
3-diethylamino-5-chloro-7-(N-benzyltrifluoromethylanilino)fluoran,
3-pyrrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(o-methoxycarbonylphenylamino) fluoran,
3-diethylamino-5-methyl-7-(α-phenylethylamino) fluoran,
3-diethylamino-7-piperidinofluoran,
2-chloro-3-(N-methyltoluidino)-7-(p-n-butylanilino) fluoran,
3-(N-methyl-N-isopropylamino)-6-methyl-7-anilinofluoran,
3-di-n-butylamino-6-methyl-7-anilinofluoran,
3-(N-benzyl-N-cyclohexylamino)-5,6-benzo-7-α-naphthylamino-4'-bromofluoran,
3-dimethylamino-6-chloro-7-anilinofluoran,
3-diethylamino-6-methyl-7-mesidino-4',5'-benzofluoran,
3-N-methyl-N-isopropyl-6-methyl-7-anilinofluoran,
3-N-ethyl-N-isoamyl-6-methyl-7-anilinofluoran, and
3-diethylamino-6-methyl-7-(2',4'-dimethylanilino)fluoran.

The thermosensitive recording layer also contains a developer. Any conventional electron acceptor or oxidizing agent which works upon the above-mentioned leuco dyes to induce color formation, such as phenol compounds, thiophenol compounds, thiourea compounds, organic acids and metal salts of organic acids, can be employed. Specific examples of such color developers include:

4,4'-isopropylidenediphenol,
3,4'-isopropylidenebisphenol,
4,4'-isopropylidenebis(o-methylphenol),
4,4'-sec-butylidenebisphenol,
4,4'-isopropylidenebis(2-tert-butylphenol),
2,2'-methylenebis(4-ethyl-6-tert-butylphenol), zinc p-nitrobenzoate,
1,3,5-tris(4-tert-butyl-3-hydroxy-2,6-dimetylbenzyl)-isocyanuric acid,
2,2-(3,4'-dihydroxydiphenyl)propane,
11,3-bis(4-hydroxyphenylthio)-2-hydroxypropane,
bis(4-hydroxy-3-methylphenyl)sulfide,
4-[β-(p-methoxyphenoxy)ethoxy]salicylate,
1,7-bis(4-hydroxyphenylthio)-3,5-dioxaheptane,
1,5-bis(4-hydroxyphenylthio)-5-oxapentane,
monocalcium salt of monobenzylphthalate,
4,4'-cyclohexylidenediphenol,
4,4'-isopropylidenebis (2-chlorophenol),
2,2'-methylenebis(4-methyl-6-tert-butylphenol),
1,1,3-tris(2-methyl-4-hydroxy-5-tert-butylphenyl)butane,
1,1,3-tris(2-methyl-4-hydroxy-5-cyclohexylphenyl)butane,
4,4'-thiobis(6-tert-butyl-2-methyl)phenol,
4,4'-diphenolsulfone,
4,2'-diphenolsulfone,
4-isoproxy-4'-hydroxydiphenylsulfone,
4-benzyloxy-4'-hydroxydiphenylsulfone,
4,4'-diphenolsulfoxide,
isopropyl p-hydroxybenzoate,
benzyl p-hydroxybenzoate,
benzyl protocatechuate,
stearyl gallate,
lauryl gallate,
octyl gallate,
1,3-bis(4-hydroxyphenylthio)propane,
N,N'-diphenylthiourea,
N,N'-di(m-chlorophenyl)thiourea,
salicylanilide,
5-chlorosalicylanilide,
salicyl-o-chloroanilide,
bis(4-hydroxyphenyl)methyl acetate,
bis(4-hydroxyphenyl)benzyl acetate,
1,3-bis(4-hydroxycumyl)benzene,
1,4-bis(4-hydroxycumyl)benzene,
2,41-diphenolsulfone,
3,3'-diallyl-4,4'-diphenolsulfone,
3,4-dihydroxy-4'-methyldiphenylsulfone,
antipyrin complex of zinc thiocyanate,
2-hydroxy-3-naphthoic acid,
2-hydroxy-1-naphthoic acid,
1-hydroxy-2-naphthoic acid,
metal (zinc, aluminum, calcium, etc.) salts of hydroxynaphthoic acid,
zinc 1-acetyloxy-2-naphthoate,
zinc 2-acetyloxy-l-naphthoate,
zinc 2-acetyloxy-3-naphthoate, α,α-bis(4-hydroxyphenyl)-α-methyltoluene,
tetrabromobisphenol A,
tetrabromobisphenol S,
4,4'-thiobis(2-methylphenol), and
4,4'-thiobis(2-chlorophenol).

These developers are employed alone or in combination.

The developer is used in an amount of from about 1 to about 20 parts, more preferably from about 2 to about 10 parts by weight, per 1 part by weight of the coloring agent.

The thermosensitive coloring layer may further comprise a binder resin. Particularly, binder resins having a hydroxyl group or carboxyl group in a molecule thereof are preferably employed. Specific examples of the above-mentioned binder resin for use in the thermosensitive coloring layer are polyvinyl butyral, polyvinyl acetal such as polyvinyl acetoacetal, cellulose derivatives such as ethyl cellulose, cellulose acetate, cellulose acetate. propionate and cellulose acetate butyrate, and epoxy resin. Those binder resins can be used alone or in combination.

The thermosensitive recording layer may contain a heat-fusible material preferably having a melting point of 50–200° C. Illustrative of suitable heat-fusible material are fatty acids such as stearic acid and behenic acid; fatty acid esters; fatty amides such as stearamide and palmitamide; fatty acid salts such as zinc stearate, calcium stearate, aluminum stearate, zinc plamitate and zinc behenate; and waxes such as stearate wax, polyethylene wax, carnauba wax, microcrystalline wax and carboxyl-modified paraffin wax, condensation products of an aromatic carboxylic acid with an amine; phenyl benzoate; higher straight chain glycols; dialkyl 3,4-epoxy-hexahydrophthalates; and higher ketones.

The thermosensitive recording layer may additionally contains various conventionally employed additives such as a surfactant, an organic or inorganic filler, an gent for preventing coloring of the leuco dye by pressure, and a lubricant.

Examples of fillers include silica, zinc oxide, aluminum hydroxide, zinc hydroxide, barium sulfate, kaolin, clay, talc, calcium carbonate, magnesium. carbonate, calcined clay, titanium oxide, diatomaceous earth, anhydrous silica, activated clay, surface treated calcium, surface treated silica, vinylidene chloride resin powder, styrene-methacrylic acid copolymer powder, nylon powder, polyethylene powder, polystyrene powder and urea-formaldehyde resin powder. Examples of the lubricant include Examples of the lubricant for use in the thermosensitive recording layer include higher fatty acids and metallic salts thereof, higher fatty amides, higher fatty acid esters, and a variety of waxes such as an animal wax, a vegetable wax, a mineral wax and a petroleum wax.

The thermosensitive recording layer may be formed on a substrate by any customarily employed method. For example, the above-described leuco dye, developer and an aqueous solution or dispersion of a binder are ground with a ball mill, an attriter or a sand mill into a particle size of 10 μm or less, preferably 5 μm or less, more preferably 1 μm or less. The resulting dispersion is then mixed with other additives such as a filler and a heat-fusible material to obtain a coating liquid. The coating liquid is applied onto the substrate and dried to form the thermosensitive recording layer thereon.

The thickness of the thermosensitive coloring layer, which depends on the formulation for the thermosensitive recording layer and intended use of the obtained thermosensitive recording adhesive label sheet, is preferably in the range of about 1 to 50 μm, and more preferably about 3 to 20 μm.

If desired, the thermosensitive recording layer may be overlaid with a protective layer for the purpose of improving the chemical resistance, water resistance, wear resistance, light resistance, surface smoothness, transparency and head-matching properties thereof. The protective layer for use in the present invention may be a film comprising as the main component a water-soluble resin or hydrophobic resin, or a film comprising as the main component an ultraviolet-curing resin or electron-beam curing resin.

Examples of the water-soluble resin for use in the protective layer are polyvinyl alcohol, modified polyvinyl alcohol, cellulose derivatives such as methyl cellulose, methoxy cellulose and hydroxy cellulose, casein, gelatin, polyvinyl pyrrolidone, styrene-maleic anhydride copolymer, diisobutylene-maleic anhydride copolymer, polyacrylamide, modified polyacrylamide, methyl vinyl ether-maleic anhydride copolymer, carboxyl-modified polyethylene, polyvinyl alcohol-polyacrylamide block copolymer, melamine-formaldehyde resin, and urea-formaldehyde resin.

Examples of the resin for an aqueous emulsion and the hydrophobic resin for use in the protective layer include polyvinyl acetate, polyurethane, styrene-butadiene copolymer, styrene-butadiene-acrylic copolymer, polyacrylic acid, polyacrylic ester, vinyl chloride-vinyl acetate copolymer, polybutyl methacrylate, polyvinyl butyral, polyvinyl acetal, ethyl cellulose, and ethylene-vinyl acetate copolymer. Further, a copolymer comprising a monomer constituting the above-mentioned resins and a silicone segment may also be preferably employed. Those resins may be used alone or in combination. When necessary, the resin may be cured using a curing agent. The ultraviolet-curing resin for use in the protective layer is prepared by polymerizing a monomer, oligomer or prepolymer which is polymerizable to form a cured resin by the application of ultraviolet light thereto. There are no limitations on such a monomer, oligomer or prepolymer for the preparation of the ultraviolet-curing resin for use in the protective layer, but conventional monomers, oligomers, or prepolymers can be employed. There are no particular limitations on the electron-beam curing resin for use in the protective layer. An electron-beam curing resin comprising a polyester skeleton with a five or more functional branched molecular structure, and a silicone-modified electron-beam curing resin are preferred in the present invention.

For the purpose of further improving the matching properties of the obtained recording label to a thermal head, the protective layer may further comprise an inorganic and organic filler, and a lubricant so long as the surface smoothness of the protective layer is not decreased. It is preferable that the particle size of the filler for use in the protective layer be 0.3 $\mu$m or less. Further, the oil absorption of the filler is preferably 30 ml/100 g or more, and more preferably, 80 ml/100 g or more.

The above-mentioned inorganic and organic filler for use in the protective layer, which may be used alone or in combination, can be selected from any pigments used in the conventional thermosensitive recording materials. Specific examples of the inorganic pigment for use in the protective layer are calcium carbonate, silica, zinc oxide, titanium oxide, aluminum hydroxide, zinc hydroxide, barium sulfate, clay, talc, and surface-treated calcium and silica. Specific examples of the organic pigment for use in the protective layer are urea-formaldehyde resin, styrene-methacrylic acid copolymer and polystyrene resin. The lubricant described with reference to the thermosensitive recording layer may be also used in the protective layer.

The protective layer may be provided by any of the conventional coating methods. It is preferable that the thickness of the protective layer be in the range of 0.1 to 20 $\mu$m, and more preferably in the range of 0.5 to 10 $\mu$m. When the thickness of the protective layer is within the above-mentioned range, the functions of the protective layer, that is, the improvements of preservation stability of the recording label and head-matching properties of the thermosensitive coloring layer can be sufficiently expected, and the decrease of thermal sensitivity of the thermosensitive recording layer can be prevented.

A heat insulating layer (not shown) may be suitably interposed between the support 11 and the adhesive layer 20 and/or between the support 11 and the thermosensitive recording layer 12 for the purpose of improving heat-sensitivity of the thermosensitive recording layer 12 . The heat insulating layer interposed between the support 11 and the thermosensitive recording layer 12 may also serve to prevent heat for heating and activating the adhesive layer 20 from conducting to the thermosensitive recording layer 12 so that the background coloring of the thermosensitive recording layer 12 during non-printing stage can be prevented.

The heat insulating layer comprises a binder, insulating particles and, if necessary, additives such as filler, heat fusible substance, pigment and surfactant.

Specific examples of the binder for the heat insulating layer include latexes such as styrene-butadiene rubbers (SBR), methyl methacrylate-butadiene copolymers (MBR) and acrylonitrile-butadiene rubbers (NBR); water soluble resins such as polyvinyl alcohol, carboxy modified polyvinyl alcohol, amino modified polyvinyl alcohol, epoxy modified polyvinyl alcohol, cellulose derivatives, starch and derivatives thereof, polyacrylic acid and derivatives thereof, styrene-acrylic acid copolymers, poly(meth)acrylamide and derivatives thereof, polyethylene imine, and isobutylene-maleic anhydride copolymers and derivatives thereof.

Examples of the filler for use in the heat insulating layer include inorganic fillers such as calcium carbonate, silica, zinc oxide, titanium oxide, aluminumhydroxide, zinchydroxide, bariumsulfate, clay, talc, surface treated silica and calcium carbonate; and organic fillers such as urea-formaldehyde resins, styrene-methacrylic acid copolymers, polystyrene resins and the like.

The insulating particles may be (a) minute void particles with a voidage of 30% or more, each made of a thermoplastic resin as its shell, (b) porous pigment particles or (c) expanded filler.

The minute void particles with a voidage of 30% or more are minute particles expanded so that air or other gases are contained therewithin. The minute void particles with a number average particle size of 2 to 20 $\mu$m, preferably 3 to 10 $\mu$m are employed. When the number average particle diameter (outer diameter) of the minute void particles is 2 $\mu$m or less, void particles with a desired voidage cannot be easily produced. When the number average particle diameter of the minute void particles is 20 $\mu$m or more, the surface smoothness of the obtained insulating layer is lowered. It is preferred that the minute particles be classified to have a uniform particle size.

The voidage of the minute void particles for use in the insulating layer is 30% or more, preferably 50% or more. When the insulating layer interposed between the support and the heat activatable adhesion layer has a voidage of 30% or less, sufficient insulating properties cannot be obtained, so that the thermal energy applied to the adhesive layer by a heating medium for heat activation cannot be efficiently used for heat activation thereof and, hence, improvement in adhesion cannot be attained.

The term "voidage" of minute void particles herein is intended to refer to a percentage obtained by the following formula:

Voidage (%) $DI/DO \times 100$ wherein DI and DO represent the inner and outer diameters of the void particles, respectively.

The minute void particles are formed of a thermoplastic resin which constitutes shells thereof, as previously mentioned. As the above-mentioned thermoplastic resin, a copolymer resin containing as major components vinylidene chloride and acrylonitrile is preferably employed.

Examples of the porous pigment for use in the insulating layer include organic pigments such as urea-formaldehyde resin, and inorganic pigments such as shirasu clay.

The insulating layer may be formed on the support or on the release liner as follows. The above-mentioned minute void particles or porous pigment particles are dispersed in water together with a binder to obtain a coating liquid. The coating liquid thus prepared is then coated on the substrate and dried to obtain the insulating layer formed on the substrate. In this case, the deposition amount of the minute void particles is preferably at least 1 $g/m^2$, more preferably in the range of about 2 to 15 $g/m^2$. The binder is generally used in an amount of 2 to 50% by weight based on the total weight of the minute void particles and the binder.

As the binder for the insulating layer any water soluble polymer or water insoluble polymer may be used. Examples of the water soluble polymer include polyvinyl alcohol, starch and derivatives thereof, cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, alkali salts of isobutylene-maleic anhydride copolymer, polyacrylamide, sodium alginate, gelatin, and casein. Examples of the water insoluble polymer include latexes of styrene-butadiene copolymer and styrene-butadiene-acrylic copolymer; and emulsions of vinyl acetate resin, vinyl acetate-acrylic acid copolymer, styrene-acrylic ester copolymer, acrylic ester resin, and polyurethane resin.

The following examples will further illustrate the present invention. Parts and percentages are by weight.

EXAMPLE 1

A transparency improving layer forming liquid having the formulation shown below was applied to a surface of a plain paper (wood free paper; basis weight: 47 $g/m^2$; thickness: 60 μm) obtained from wood pulp having a Canadian standard freeness value of 400 ml to form a transparency improving layer having a basis weight of 7 $g/m^2$ (on dry basis) on the paper.

| Transparency improving layer forming liquid: | |
| --- | --- |
| Paraffin wax (emulsion; solid content: 40%) | 20 parts |
| Aqueous polyvinyl alcohol solution (10% solution) | 20 parts |
| Calcium carbonate | 10 parts |
| Water | 50 parts |

To the thus obtained paper having the transparency improving layer, a barrier layer having the following formulation was applied to form a barrier layer having a basis weight of 4 $g/m^2$ (on dry basis).

| Barrier layer forming liquid: | |
| --- | --- |
| Aqueous polyvinyl alcohol solution (10% solution) | 50 parts |
| Calcium carbonate | 10 parts |
| Water | 40 parts |

The resulting laminate having the barrier layer was subjected to calendaring (pressure: 50 $kg/cm^2$; speed: 15 m/minute; repeated 3 times in total), to which a release liner coating material having the following formulation was applied to form a release liner having a basis weight of 1 $g/m^2$.

| Release liner coating material: | |
| --- | --- |
| Solventless addition curable silicone | 100 parts |
| Curing catalyst | 1.5 parts |

To the thus obtained composite sheet, an acrylic pressure sensitive adhesive (solid content: 54%; commercially available from Japan NSC Co., Ltd.) was applied in an amount of 18 $g/m^2$ (on dry basis) so that an adhesive layer was provided on the release liner of the composite sheet. A thermosensitive recording sheet (130LAB-1 manufactured by Ricoh Company, Ltd.) was then bonded to the composite sheet such that the support of the recording sheet was in contact with the adhesive layer of the composite sheet, thereby obtaining a thermosensitive recording adhesive label assembly.

EXAMPLE 2

Example 1 was repeated in the same manner as described except that the calcium carbonate in each of the transparency improving layer forming liquid and the barrier layer forming liquid was replaced by colloidal silica (solid content: 40%), thereby obtaining a thermosensitive recording adhesive label assembly.

EXAMPLE 3

Example 1 was repeated in the same manner as described except that the calcium carbonate in the barrier layer forming liquid was replaced by a urea-formaldehyde resin filler (solid content: 27%), thereby obtaining a thermosensitive recording adhesive label assembly.

EXAMPLE 4

Example 1 was repeated in the same manner as described except that the calcium carbonate in the transparency improving layer forming liquid was replaced by clay, thereby obtaining a thermosensitive recording adhesive label assembly.

EXAMPLE 5

Example 1 was repeated in the same manner as described except that the calcium carbonate in the transparency improving layer forming liquid was not used at all, thereby obtaining a thermosensitive recording adhesive label assembly.

EXAMPLE 6

Example 1 was repeated in the same manner as described except that the calcium carbonate the barrier layer forming liquid was not used at all, thereby obtaining a thermosensitive recording adhesive label assembly.

EXAMPLE 7

Example 1 was repeated in the same manner as described except that a polyester resin was substituted for the paraffin wax emulsion and that neither polyvinyl alcohol nor calcium carbonate were used (the transparency improving layer consisted of the polyester resin), thereby obtaining a thermosensitive recording adhesive label assembly.

EXAMPLE 8

Example 1 was repeated in the same manner as described except that a styrene-acrylate copolymer resin emulsion (solid content: 40%) in the transparency improving layer forming liquid was substituted for the paraffin wax emulsion, thereby obtaining a thermosensitive recording adhesive label assembly.

EXAMPLE 9

Example 1 was repeated in the same manner as described except that the calcium carbonate in each of the transparency improving layer forming liquid and the barrier layer forming liquid was not used at all, thereby obtaining a thermosensitive recording adhesive label assembly.

EXAMPLE 10

Example 1 was repeated in the same manner as described except that the calendaring (pressure: 50 kg/cm$^2$; speed: 15 m/min) was repeated 5 times in total, thereby obtaining a thermosensitive recording adhesive label assembly.

EXAMPLE 11

Example 1 was repeated in the same manner as described except that the plain paper was subjected to calendaring (pressure: 50 kg/cm$^2$; speed: 15 m/min; repeated 3 times in total) before the formation of respective layers thereon, thereby obtaining a thermosensitive recording adhesive label assembly.

EXAMPLE 12

Example 1 was repeated in the same manner as described except that the transparency improving layer having a basis weight of 7 g/m$^2$ was formed with the use of a transparency improving layer forming liquid having a composition shown below and that the barrier layer was not formed (namely, the release liner was formed directly on the transparency improving layer), thereby obtaining a thermosensitive recording adhesive label assembly.

| Transparency improving layer forming liquid: | |
| --- | --- |
| Paraffin wax (emulsion; solid content: 40%) | 20 parts |
| Aqueous polyvinyl alcohol solution (10% solution) | 50 parts |
| Water | 30 parts |

EXAMPLE 13

Example 1 was repeated in the same manner as described except that a printability improving layer forming liquid having a composition shown below was applied to an opposite side of the paper layer from the transparency improving layer to form a printability improving layer having a basis weight of 2 gm$^2$, thereby obtaining a thermosensitive recording adhesive label assembly. Further, a calendar treatment was carried out after the formation of the printability improving layer so that the printability improving layer had a surface smoothness of 200 seconds.

| Printability improving layer forming liquid: | |
| --- | --- |
| Aqueous aluminum hydroxide dispersion (solid content: 20%) | 50 parts |
| Aqueous emulsion of styrene-butadiene rubber (solid content: 20%) | 15 parts |
| Water | 35 parts |

EXAMPLE 14

Example 13 was repeated in the same manner as described except that the printability improving layer was formed with the use of a printability improving layer forming liquid having a composition shown below, thereby obtaining a thermosensitive recording adhesive label assembly.

| Printability improving layer forming liquid: | |
| --- | --- |
| Aqueous emulsion of styrene-acrylate resin filler (solid content: 40%) | 25 parts |
| Aqueous emulsion of styrene-butadiene rubber (solid content: 20%) | 15 parts |
| Water | 35 parts |

EXAMPLE 15

Example 13 was repeated in the same manner as described except that the printability improving layer was formed with the use of a printability improving layer forming liquid having a composition shown below, thereby obtaining a thermosensitive recording adhesive label assembly.

| Printability improving layer forming liquid: | |
| --- | --- |
| Aqueous aluminum hydroxide dispersion (solid content: 20%) | 50 parts |
| Aqueous polyvinyl alcohol solution (15% solution) | 40 parts |
| Water | 35 parts |

EXAMPLE 16

Example 13 was repeated in the same manner as described except that the basis weight of the printability improving layer was increased to 5 g/m$^2$, thereby obtaining a thermosensitive recording adhesive label assembly.

EXAMPLE 17

Example 13 was repeated in the same manner as described except that the basis weight of the printability improving layer was decreased to 0.6 g/m$^2$, thereby obtaining a thermosensitive recording adhesive label assembly.

EXAMPLE 18

Example 13 was repeated in the same manner as described except that the calendar treatment was carried out before the formation of the printability improving layer rather than after the formation of the printability improving layer, thereby obtaining a thermosensitive recording adhesive label assembly. The surface smoothness of the printability improving layer was thus decreased to 80 seconds.

EXAMPLE 19

Example 13 was repeated in the same manner as described except that the printability improving layer was formed with the use of a printability improving layer forming liquid having a composition shown below, thereby obtaining a thermosensitive recording adhesive label assembly.

| Printability improving layer forming liquid: | |
| --- | --- |
| Aqueous aluminum hydroxide dispersion (solid content: 20%) | 20 parts |
| Aqueous emulsion of styrene-butadiene rubber (solid content: 20%) | 40 parts |
| Water | 35 parts |

EXAMPLE 20

Example 13 was repeated in the same manner as described except that the printability improving layer was formed with the use of a printability improving layer forming liquid having a composition shown below, thereby obtaining a thermosensitive recording adhesive label assembly.

| Printability improving layer forming liquid: | |
| --- | --- |
| Aqueous aluminum hydroxide dispersion (solid content: 20%) | 60 parts |
| Aqueous emulsion of styrene-butadiene rubber (solid content: 20%) | 8 parts |
| Water | 35 parts |

EXAMPLE 21

Example 1 was repeated in the same manner as described except that the plain paper having a Canadian standard freeness value of 400 ml was replaced by a plain paper obtained from wood pulp having a Canadian standard freeness value of 360 ml, thereby obtaining a thermosensitive recording adhesive label assembly.

EXAMPLE 22

Example 1 was repeated in the same manner as described except that the plain paper having a Canadian standard freeness value of 400 ml was replaced by a plain paper obtained from wood pulp having a Canadian standard freeness value of 480 ml, thereby obtaining a thermosensitive recording adhesive label assembly.

COMPARATIVE EXAMPLE 1

Example 1 was repeated in the same manner as described except that calendaring pressure was decreased to 20 kg/cm$^2$ and that calendaring was performed only once, thereby obtaining a thermosensitive recording adhesive label assembly.

COMPARATIVE EXAMPLE 2

Example 1 was repeated in the same manner as described except that the plain paper was replaced by glassine paper obtained from wood pulp having a Canadian standard freeness value of 150 ml, thereby obtaining a thermosensitive recording adhesive label assembly.

COMPARATIVE EXAMPLE 3

Example 1 was repeated in the same manner as described except that the transparency improving layer was formed with the use of a transparency improving layer forming liquid having a composition shown below, thereby obtaining a thermosensitive recording adhesive label assembly.

| Transparency improving layer forming liquid: | |
| --- | --- |
| Paraffin wax (emulsion; solid content: 40%) | 0.1 part |
| Aqueous polyvinyl alcohol solution (10% solution) | 40 parts |
| Water | 59.9 parts |

COMPARATIVE EXAMPLE 4

Example 1 was repeated in the same manner as described except that the plain paper having a Canadian standard freeness value of 400 ml was replaced by a plain paper obtained from wood pulp having a Canadian standard freeness value of 330 ml, thereby obtaining a thermosensitive recording adhesive label assembly.

COMPARATIVE EXAMPLE 5

Example 1 was repeated in the same manner as described except that the plain paper having a Canadian standard freeness value of 400 ml was replaced by a plain paper obtained from wood pulp having a Canadian standard freeness value of 550 ml, thereby obtaining a thermosensitive recording adhesive label assembly.

The composite sheets or the thermosensitive recording adhesive label assemblies obtained in Examples 1 to 22 and Comparative Examples 1 to 5 were measured for the bulk density, light transmittance, detectability by a label position sensor, disintegratability, releasability, surface glossiness, machinability in dye cutting and printability according to the following methods. The results are shown in Tables 1 and 2.

(1) Transmittance:

A spectrophotometer was used to measure a transmittance of light with wavelengths of 940 and 960 nm.

(2) Detectability by Label Position Sensor:

The thermosensitive recording adhesive label assembly was subjected to die cutting to cut the thermosensitive recording sheet provided on the composite sheet into labels. The label assembly was then printed using a label printer (Model 3600XT manufactured by Teraoka Seiko Co., Ltd.) to check whether the label was suitably detected by a position sensor of the label printer. The detectability was evaluated by the following ratings:

A: detectable

B: occasionally not detectable

C: not detectable (3) Disintegratability:

The composite sheet was subjected to a disintegration treatment using a disintegrating device according to Japanese Industrial Standard JIS P8209. The disintegratability was evaluated according to the following ratings:

A: good disintegratability (easily recyclable)
B: fair disintegratability (recyclable)
C: no good disintegratability (not recyclable)

(4) Releasability:

Labels (size: 40×60 mm) were peeled off from the composite sheet with fingers to evaluate the releasability according to the following ratings:

A: good releasability
B: fair releasability
C: no good releasability (5) Surface Glossiness:

Glossiness (angle of incidence: 75 degrees) was measured using GLOSS-METER manufactured by Nippon Denshoku Industry Co., Ltd.

(6) Machinability:

The thermosensitive recording adhesive label assembly was subjected to die cutting with a rotary cutter (cutter knife: 60 mm×36 mm) at a cutting speed of 50 m/minute to cut the thermosensitive recording sheet provided on the composite sheet into labels. The pressing force of the cutter used was a minimum pressure required for smoothly removing cut remnants from the label assembly. After the die cutting, the labels were removed to observe the surface of the composite sheet (backing sheet). Machinability was evaluated according to the following ratings:

A: good machinability (only slight scars and flaws are observed; no problem will arise)
B: fair machinability (clear scars and flaws are observed; no practical problem will)
C: poor machinability (deep slight scars and flaws are observed; problem will be caused)

(7) Pritability:

The backside of the composite sheet was printed (ink : Gman ULP022 Blue, amount: 0.3 ml) and the image density was measured using RI tester.

TABLE 1

| Example | Transmittance (%) 940 nm | Transmittance (%) 960 nm | Bulk density (g/cm³) | Detectability | Disintegratability | Peelability |
|---|---|---|---|---|---|---|
| 1 | 11.6 | 11.8 | 0.98 | A | A | A |
| 2 | 12.0 | 12.2 | 0.98 | A | A | A |
| 3 | 10.8 | 11.0 | 0.99 | A | A | A |
| 4 | 11.4 | 11.6 | 0.98 | A | A | A |
| 5 | 13.8 | 14.0 | 0.98 | A | A | A |
| 6 | 12.8 | 13.0 | 0.99 | A | A | A |
| 7 | 11.2 | 11.4 | 0.98 | A | A | A |
| 8 | 10.6 | 10.8 | 0.98 | A | A | A |
| 9 | 15.3 | 15.5 | 0.98 | A | A | A |
| 10 | 12.0 | 12.2 | 1.03 | A | A | A |
| 11 | 11.8 | 12.0 | 1.00 | A | A | A |
| 12 | 14.2 | 14.4 | 0.99 | A | A | A |
| 13 | 11.4 | 11.6 | 0.99 | A | A | A |
| 14 | 11.4 | 11.6 | 0.98 | A | A | A |
| 15 | 11.5 | 11.6 | 0.98 | A | A | A |
| 16 | 11.2 | 11.4 | 0.98 | A | A | A |
| 17 | 11.6 | 11.8 | 0.99 | A | A | A |
| 18 | 11.3 | 11.5 | 0.98 | A | A | A |
| 19 | 11.5 | 11.7 | 0.98 | A | A | A |
| 20 | 11.3 | 11.5 | 0.98 | A | A | A |
| 21 | 11.7 | 11.9 | 0.99 | A | A | A |
| 22 | 10.4 | 10.6 | 0.97 | A | A | A |
| Comp.1 | 10.6 | 10.8 | 0.86 | A | A | A |
| Comp.2 | 17.5 | 17.8 | 1.08 | A | C | A |
| Comp.3 | 9.4 | 9.6 | 0.98 | C | A | A |
| Comp.4 | 11.8 | 12.0 | 0.99 | A | B | A |
| Comp.5 | 9.8 | 10.0 | 0.97 | B | A | A |

TABLE 2

| Example | Surface Glossiness (%) | Machinability | Printability |
|---|---|---|---|
| 1 | 18.0 | A | 1.20 |
| 2 | 18.5 | A | 1.21 |
| 3 | 16.0 | A | 1.20 |
| 4 | 19.0 | A | 1.21 |
| 5 | 25.0 | A | 1.21 |
| 6 | 28.5 | A | 1.22 |
| 7 | 23.0 | A | 1.20 |
| 8 | 35.0 | B | 1.21 |
| 9 | 37.0 | B | 1.21 |
| 10 | 24.0 | A | 1.20 |
| 11 | 20.5 | A | 1.22 |
| 12 | 34.5 | B | 1.22 |
| 13 | 19.0 | A | 1.46 |
| 14 | 19.0 | A | 1.44 |
| 15 | 19.0 | A | 1.45 |
| 16 | 19.0 | A | 1.52 |
| 17 | 19.0 | A | 1.35 |
| 18 | 19.0 | A | 1.39 |
| 19 | 19.0 | A | 1.48 |
| 20 | 19.0 | A | 1.41 |
| 21 | 20.0 | A | 1.25 |
| 22 | 18.0 | A | 1.19 |
| Comp.1 | 14.0 | A | 1.21 |
| Comp.2 | 22.0 | A | 1.48 |
| Comp.3 | 15.5 | A | 1.20 |
| Comp.4 | 16.0 | A | 1.27 |
| Comp.5 | 21.0 | A | 1.12 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. 2001-398076, filed Dec. 27, 2001, and No. 2002-078767 filed Mar. 20, 2002, inclusive of the specification, claims and drawings, are hereby incorporated by reference herein.

What is claimed is:

1. A composite sheet comprising a paper layer made of a wood pulp having a Canadian standard freeness value of 350 to 500 ml, a transparency improving layer provided over one side of said paper layer, and a release liner provided over an opposite surface of said transparency improving layer from said paper layer, said composite sheet having a transmittance of 10 to 20% for a light with a wavelength of 940 to 960 nm and a bulk density of 0.90 to 1.15 g/cm³.

2. A composite sheet as claimed in claim 1, wherein said release liner has a surface glossiness of 10 to 50% for an angle of incidence of 75 degrees.

3. A composite sheet comprising:
   a paper layer made of a wood pulp having a Canadian standard freeness value of 350 to 500 ml;
   a transparency improving layer provided over one side of said paper layer;
   a release liner provided over an opposite surface of said transparency improving layer from said paper layer, said composite sheet having a transmittance of 10 to 20% for a light with a wavelength of 940 to 960 rim and a bulk density of 0.90 to 1.15 g/cm³; and
   a barrier layer provided between said transparency improving layer and said release liner.

4. A composite sheet as claimed in claim 3, wherein at least one of said transparency improving layer and said barrier layer contains a filler.

5. A composite sheet as claimed in claim 1, further comprising a printability improving layer provided on the other side of said paper layer and comprising a resin and a pigment.

6. A composite sheet as claimed in claim 5, wherein said printability improving layer has a surface smoothness of at least 100 seconds.

7. A composite sheet comprising:
- a paper layer made of a wood pulp having a Canadian standard freeness value of 350 to 500 ml;
- a transparency improving layer provided over one side of said paper layer;
- a release liner provided over an opposite surface of said transparency improving layer from said paper layer, said composite sheet having a transmittance of 10 to 20% for a light with a wavelength of 940 to 960 nm and a bulk density of 0.90 to 1.15 g/cm$_3$; and
- a printability improving layer provided on the other side of said paper layer and comprising a resin and a pigment, wherein the weight ratio of said pigment to said resin is in the range of 1:9 to 9:1.

8. A composite sheet as claimed in claim 1, wherein said release liner comprises a solventless addition curable silicone.

9. An adhesive label assembly comprising a composite sheet according to claim 1, an adhesive layer provided on said release liner of said composite sheet, and a label sheet provided on said adhesive layer such that said label sheet with said adhesive layer is peelable from said composite sheet.

10. An adhesive label assembly as claimed in claim 9, wherein said label sheet is a thermosensitive recording sheet comprising a support facing said adhesive layer and a thermosensitive layer provided on said support and comprising a leuco dye and a developer.

* * * * *

UNITED STATES PATENT AND TRADEMARK OFFICE
CERTIFICATE OF CORRECTION

PATENT NO.         : 6,846,538 B2  
APPLICATION NO. : 10/323559  
DATED                : January 25, 2005  
INVENTOR(S)       : Masahiro Sato et al.

It is certified that error appears in the above-identified patent and that said Letters Patent is hereby corrected as shown below:

cover page with the following:

Item --(45) Date of Patent:     *Jan. 25, 2005--

Replace the Notice section on the cover page of the patent, with the following:

--(*) Notice:     Subject to any disclaimer, the term of this patent is extended or adjusted under 35 U.S.C. 154(b) by 0 days.

This patent is subject to a terminal disclaimer.--

Signed and Sealed this

Eighth Day of August, 2006

JON W. DUDAS  
*Director of the United States Patent and Trademark Office*